(12) United States Patent
Kumar et al.

(10) Patent No.: US 12,373,461 B2
(45) Date of Patent: Jul. 29, 2025

(54) DOCUMENT DATABASE SYSTEM USING REPLICAS OF A STORED DOCUMENT

(71) Applicant: Microsoft Technology Licensing, LLC, Redmond, WA (US)

(72) Inventors: Brikesh Kumar, Seattle, WA (US); Muthukumaran Arumugam, Kent, WA (US); Yogesh Kumar, Sammamish, WA (US); Ankur Jauhari, Bothell, WA (US); Kiran Kumar Kolli, Redmond, WA (US); Per Mikael Horal, Sammamish, WA (US); Hari Sudan Sundar, Redmond, WA (US); Adam Bishop, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/394,047

(22) Filed: Dec. 22, 2023

(65) Prior Publication Data

US 2025/0209087 A1   Jun. 26, 2025

(51) Int. Cl.
*G06F 16/27* (2019.01)

(52) U.S. Cl.
CPC .................... *G06F 16/27* (2019.01)

(58) Field of Classification Search
CPC ........................................ G06F 16/27
See application file for complete search history.

(56) References Cited

U.S. PATENT DOCUMENTS

| | | | | |
|---|---|---|---|---|
| 5,390,302 | A * | 2/1995 | Johnson | G06F 9/466 709/230 |
| 6,067,541 | A * | 5/2000 | Raju | G06F 16/10 |
| 6,412,017 | B1 * | 6/2002 | Straube | G06F 16/1844 717/170 |
| 7,831,735 | B1 * | 11/2010 | Kabra | G06F 16/1865 709/248 |
| 8,090,880 | B2 * | 1/2012 | Hasha | G06F 16/273 709/224 |

(Continued)

OTHER PUBLICATIONS

"Read Consistency", Retrieved from: https://docs.aws.amazon.com/amazondynamodb/latest/developerguide/HowItWorks.ReadConsistency.html, Retrieved Date: Aug. 9, 2023, 2 Pages.

(Continued)

*Primary Examiner* — Charles Rones
*Assistant Examiner* — Huen Wong
(74) *Attorney, Agent, or Firm* — Han Gim; Newport IP, LLC

(57) ABSTRACT

A database management system for managing a database includes each document being stored as a number of replicas for accessibility and data preservation. The system includes: a processor; a network interface; and a memory comprising programming instructions for execution by the processor to implement a database management service, the service configured to maintain a primary replica of a document, a number of secondary replicas of the document, and another log-only replica storing a log of changes to the document rather than contents of the document. The service makes head reads to the primary replica as needed when a read request to the number of secondary replicas does not result in a quorum.

16 Claims, 11 Drawing Sheets

(56) References Cited

U.S. PATENT DOCUMENTS

| | | | |
|---|---|---|---|
| 8,117,156 B2* | 2/2012 | Krishnaprasad | G06F 11/2094 711/143 |
| 8,719,225 B1* | 5/2014 | Rath | G06F 16/273 707/648 |
| 10,248,704 B2* | 4/2019 | Rath | G06F 16/27 |
| 10,461,991 B1* | 10/2019 | Morley | H04L 41/0681 |
| 10,909,143 B1* | 2/2021 | Brahmadesam | G06F 16/2228 |
| 11,604,809 B1* | 3/2023 | Vig | G06F 16/21 |
| 2005/0188085 A1* | 8/2005 | Lin | H04L 69/329 709/225 |
| 2006/0036896 A1* | 2/2006 | Gamache | G06F 11/2023 714/E11.073 |
| 2006/0090095 A1* | 4/2006 | Massa | G06F 11/181 714/4.11 |
| 2009/0037422 A1* | 2/2009 | Wong | G06F 16/27 |
| 2010/0114824 A1* | 5/2010 | Krishnaprasad | G06F 11/2094 707/637 |
| 2011/0078110 A1* | 3/2011 | Joseph | G06F 16/289 707/610 |
| 2012/0124001 A1* | 5/2012 | Shah | G06F 16/273 707/634 |
| 2012/0239722 A1* | 9/2012 | Bolosky | H04L 67/1008 709/201 |
| 2012/0290714 A1* | 11/2012 | Cohen | G06F 11/3055 709/224 |
| 2014/0164329 A1* | 6/2014 | Guo | G06F 16/951 707/634 |
| 2015/0278329 A1* | 10/2015 | Hrle | G06F 16/27 707/615 |
| 2016/0132581 A1* | 5/2016 | Hsieh | G06F 16/2343 707/615 |
| 2018/0246911 A1* | 8/2018 | Lee | G06F 16/21 |
| 2018/0337980 A1* | 11/2018 | Schreter | H04L 67/1012 |
| 2019/0340011 A1* | 11/2019 | Raman | G06F 9/466 |
| 2023/0133608 A1* | 5/2023 | Kumar | G06F 16/215 707/703 |
| 2023/0145054 A1* | 5/2023 | VanBenschoten | G06F 16/2379 707/620 |

OTHER PUBLICATIONS

"Structuring Data for Strong Consistency", Retrieved from: https://cloud.google.com/datastore/docs/concepts/structuring_for_strong_consistency, Oct. 31, 2023, 8 Pages.

* cited by examiner

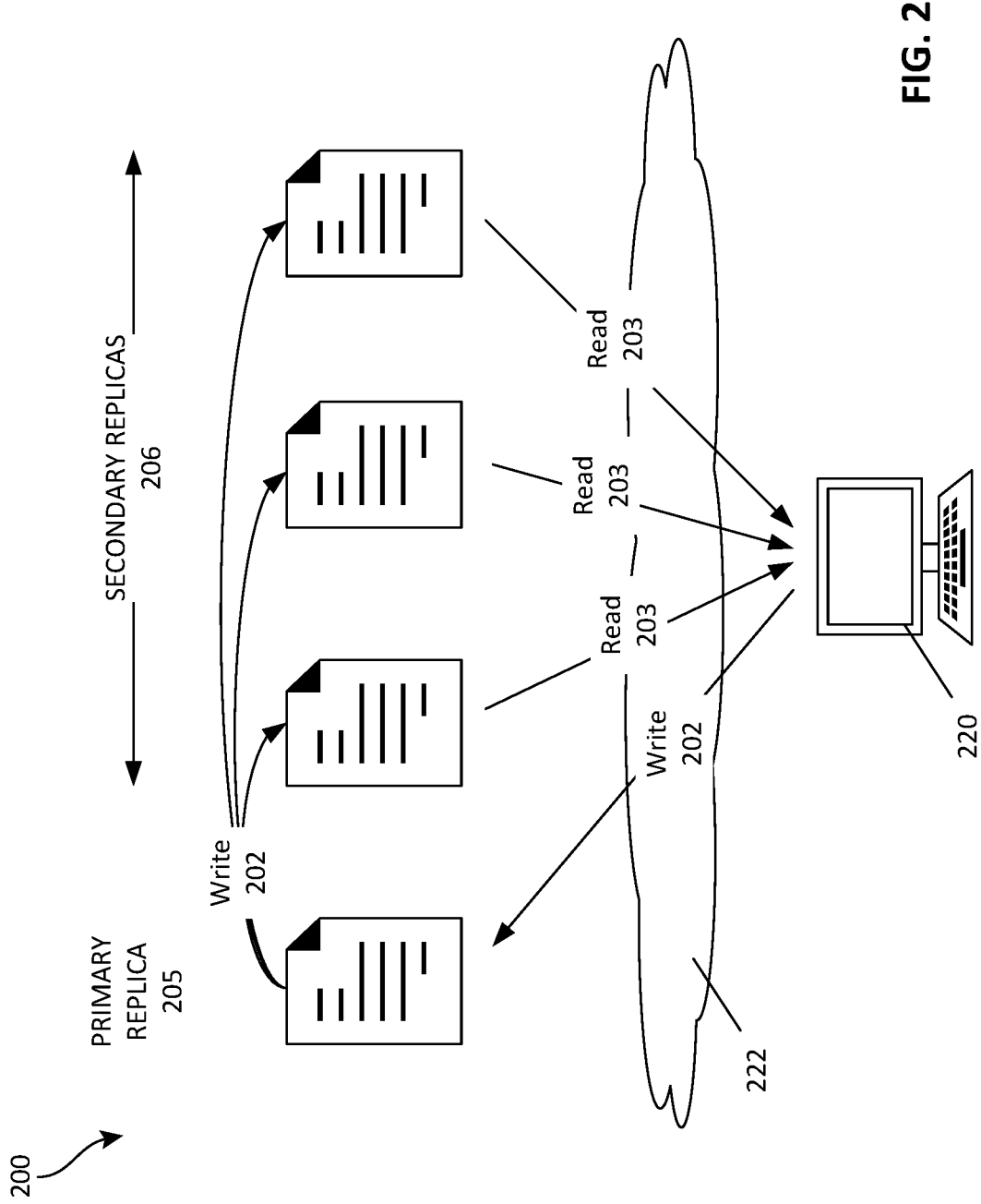

DOCUMENT DATABASE SYSTEM USING REPLICAS OF A STORED DOCUMENT

BACKGROUND

A time-honored strategy for ensuring the availability and the survival of information is to maintain multiple copies of the information. This practice, rooted in the acknowledgment of the inherent vulnerabilities and uncertainties surrounding information storage and transmission, has evolved over time to adapt to technological advancements. Digital information, while highly malleable and easily replicable, faces new challenges such as hardware failures, software bugs, and cyber threats. As a response, redundancy has become a cornerstone of digital preservation.

For added security, multiple copies of information may be stored on different systems or even across geographically dispersed locations. Cloud storage services, data centers, and distributed networks enable the replication of digital content, ensuring that even in the face of natural disasters, technological failures, or malicious attacks, information remains resilient. The use of version control systems and backup protocols further refines this strategy, allowing for the restoration of data to specific points in time.

However, creating and maintaining multiple digital copies of information in different locations is not without cost. Bandwidth, processing resources, storage capacity and energy are all consumed as more data is stored in multiple copies. This presents a technical problem for which technical solutions will preserve the advantages of having multiple distributed copies of information while limiting the demand for resources that multiple copies typically have required.

SUMMARY

In one general aspect, the following description presents a database management system for managing a database in which each document is stored as a number of replicas for accessibility and data preservation. The system includes: a processor; a network interface; and a memory comprising programming instructions for execution by the processor to implement a database management service, the service configured to maintain a primary replica of a document, a number of secondary replicas of the document, and another log-only replica storing a log of changes to the document rather than contents of the document. The service makes head reads to the primary replica as needed when a read request to the number of secondary replicas does not result in a quorum.

In another general aspect, the following description presents a database management system for managing a database in which each document is stored as a number of replicas for accessibility and data preservation. The system includes: a processor; a network interface; and a memory comprising programming instructions for execution by the processor to implement a database management service, the service configured to maintain a primary replica of a document, only two secondary replicas of the document, and a fourth log-only replica storing a log of changes to the document. The service makes head reads to the primary replica as needed when a read request to the number of secondary replicas does not result in a quorum.

In another general aspect, the following description presents a method of managing a database in which each document is stored as a number of replicas for accessibility and data preservation. The method includes: maintaining a primary replica of a document, maintaining a number of secondary replicas of the document, maintaining another document replica that stores a log of changes to the document rather than full contents of the document, and making read calls to the primary replica as needed when a read request to the number of secondary replicas does not form a quorum, wherein a quorum comprising receiving a response from (n−n/2) replicas that have a same version of the document, where n is a total number of the replicas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 depicts a system of utilizing multiple copies of information to promote continuous access to and survivability of the information.

DETAILED DESCRIPTION

Figure 1:
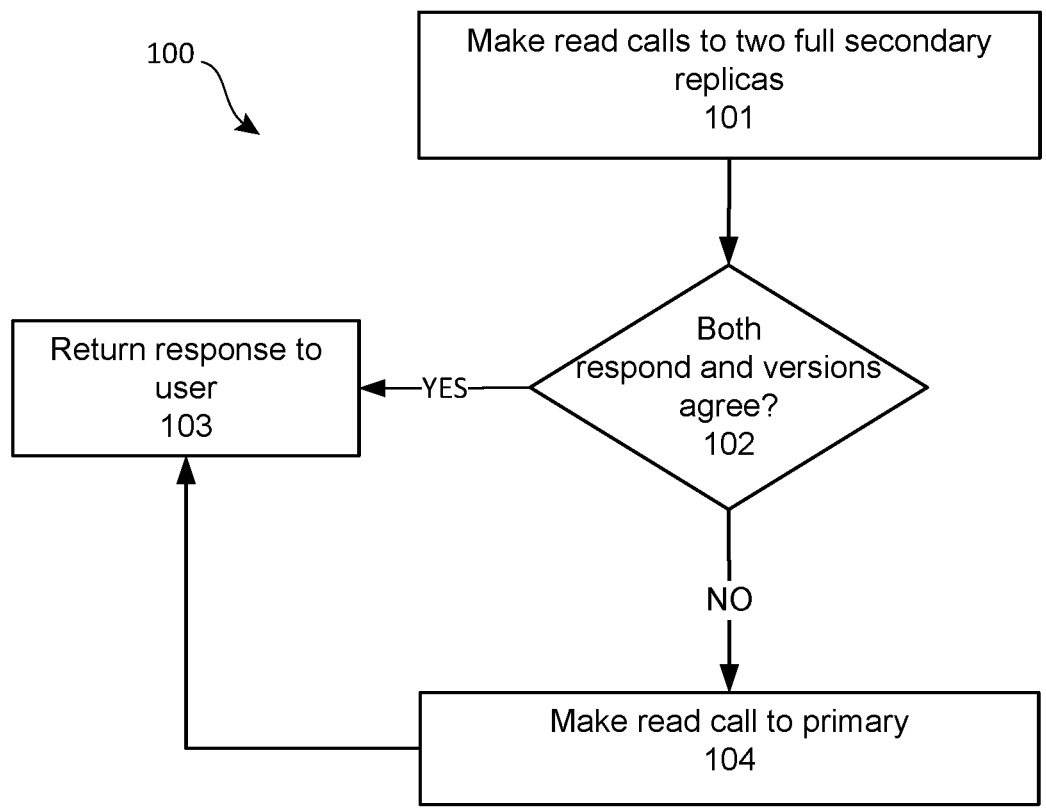
FIG. 1 depicts an example method of a technique that maintains the advantages of having multiple distributed copies of information while limiting the demand for resources that multiple copies typically have required. The example of FIG. 1 is a method in which aspects of this disclosure may be implemented.

As noted above, creating and maintaining multiple digital copies of information in different locations helps ensure access to and survivability of the data, but is not without cost. Bandwidth, processing resources, storage capacity and energy are all consumed as more data is stored in multiple copies. This presents a technical problem for which the following technical solutions can preserve the advantages of having multiple distributed copies of information while limiting the demand for resources that multiple copies typically have required. Specifically, the following will describe techniques for reducing a number of copies of information that are needed without compromising availability and survivability of the information. More specifically, the following description will detail an example of a client Software Development Kit (SDK) for document database systems using fewer copies or replicas to ensure consistent reads without compromising on resiliency.

As used herein, the term "document" will be used broadly to refer to any data structure that is stored in multiple copies to promote uninterrupted access and longevity of the data. A document could be, for example, a document, a file, computer code, an image, an audio file, an audiovisual file or any other data structure.

As used herein, the term "quorum" refers to the condition in which a minimum number of replicas have the same version of a document. Forming a "quorum" refers to, if the quorum number is two, having two or more replicas report a same version of a document in response to a read request.

As used herein, the term "log-only replica" refers to a data structure that is, for some purposes, counted as a replica of a document, but that does not contain the full contents of the document in some version. Rather, the log-only replica contains a log of changes or edits made to the document over time. This may correspond to the write commands made to a primary replica by a client system.

As noted above, a document database system usually has multiple copies of data referred to as replicas. In many such systems, the number of replicas may be four, including one primary replica and three secondary replicas, each of which includes a full copy of the contents of the document and which is updated as write commands are committed. This number of replicas has been shown to provide a balance between the need for data resiliency and the demand on resources caused by a growing number of replicas. In such a system, one of the replicas is designated as the primary. The other three are naturally designated as secondary replicas or secondaries. Again, this helps in making the database system resilient and also more fault tolerant. In such a system, writes to the document are typically addressed to the primary replica, while read requests are addressed to the secondary replicas.

In contrast to this model, the following description provides a new model in which fewer secondary replicas are needed. The model utilizes some strategic read requests being made to the primary replica to reduce the need for secondary replicas without sacrificing the integrity of the document and its data.

FIG. 1 depicts an example method 100 of this technique. In the model underlying FIG. 1, there is one primary replica and only two secondary replicas. A fourth data structure, still referred to as a replica, is also utilized. However, unlike an actual secondary replica, this fourth replica does not store the full data of the document. Rather, the fourth replica contains only a log that records changes made to the document over time.

As shown in FIG. 1, the method 100 includes making a read call 101 to the two full secondary replicas. If both replicas return a response and their versions agree 102, then the response is returned to the user 103 and is considered an accurate report reflecting the current content of the document. However, if one of the secondary replicas fails to respond or the versions returned by the secondary replicas do not agree 102, the response is not considered to represent the current state of the document. Accordingly, a read call is the made to the primary replica 104 to ascertain the correct current state of the document before a response is returned to the user. A more detailed illustration and explanation of this method is given below in reference FIGS. 5A-C.

Moving to FIG. 2, FIG. 2 depicts a system of utilizing multiple copies of information to promote continuous access to and survivability of the information. FIG. 2 illustrates additional background for the method being described herein. As noted above, in many such systems, four document replicas are used. This number of replicas has been shown to provide a balance between the need for data resiliency and the demand on resources caused by a growing number of replicas. Again, one of the replicas is designated as the primary. The other three are naturally designated as secondary replicas or secondaries. These may be full copies of the document content or, in a system that saves on bandwidth, storage and other resources, one replica only contains a log of changes made to the document content.

In such a system, writes 202 to the document are typically addressed to the primary replica. In contrast, read requests 203 are addressed to the secondary replicas. Consequently, the primary replica receives and performs any write operations that change or edit the data of the document. The secondaries perform the read operations. Consequently, when a user is editing the data, the edits go to the primary replica initially. When the user is retrieving or reading the data, the read requests go to, and are serviced by, the secondaries. As noted above, the replicas may be stored on different devices, different systems and even geographically distributed sites.

Once the primary replica implements any write operation, the write operations are duplicated to and on the data of the secondaries. Once completed, this approach will ensure that all of the replicas have an exact same copy of the current data for the document.

Because this write process requires some time to complete across all the replicas, the system needs to determine when a change or "write" is effective or committed. In this example system, a write is considered committed when $(n/2+1)$ replicas have implemented the latest write, also referred to as the latest commit, where n=all replicas both primary and secondary.

For a consistent read, at least two of the three secondary replicas, also referred to as a quorum of replicas, should return the same snapshot of the document when queried. In this, and other examples that may have a different number of secondary replicas, a quorum of replicas is considered to be $(n-n/2)$ replicas, where n=all replicas both primary and secondary. Thus, in the current example, with 1 primary and 3 secondary replicas, n=4, and a quorum is 2 replicas.

Consequently, for three secondary replicas, the model usually makes a read request to all three secondary replicas and then receives in response the version of the document as then available at each replica. The model waits until two of the secondary replicas have the same latest version. When two secondaries are not up and running for any reason, this will add some latency to the approach.

Figure 3A:
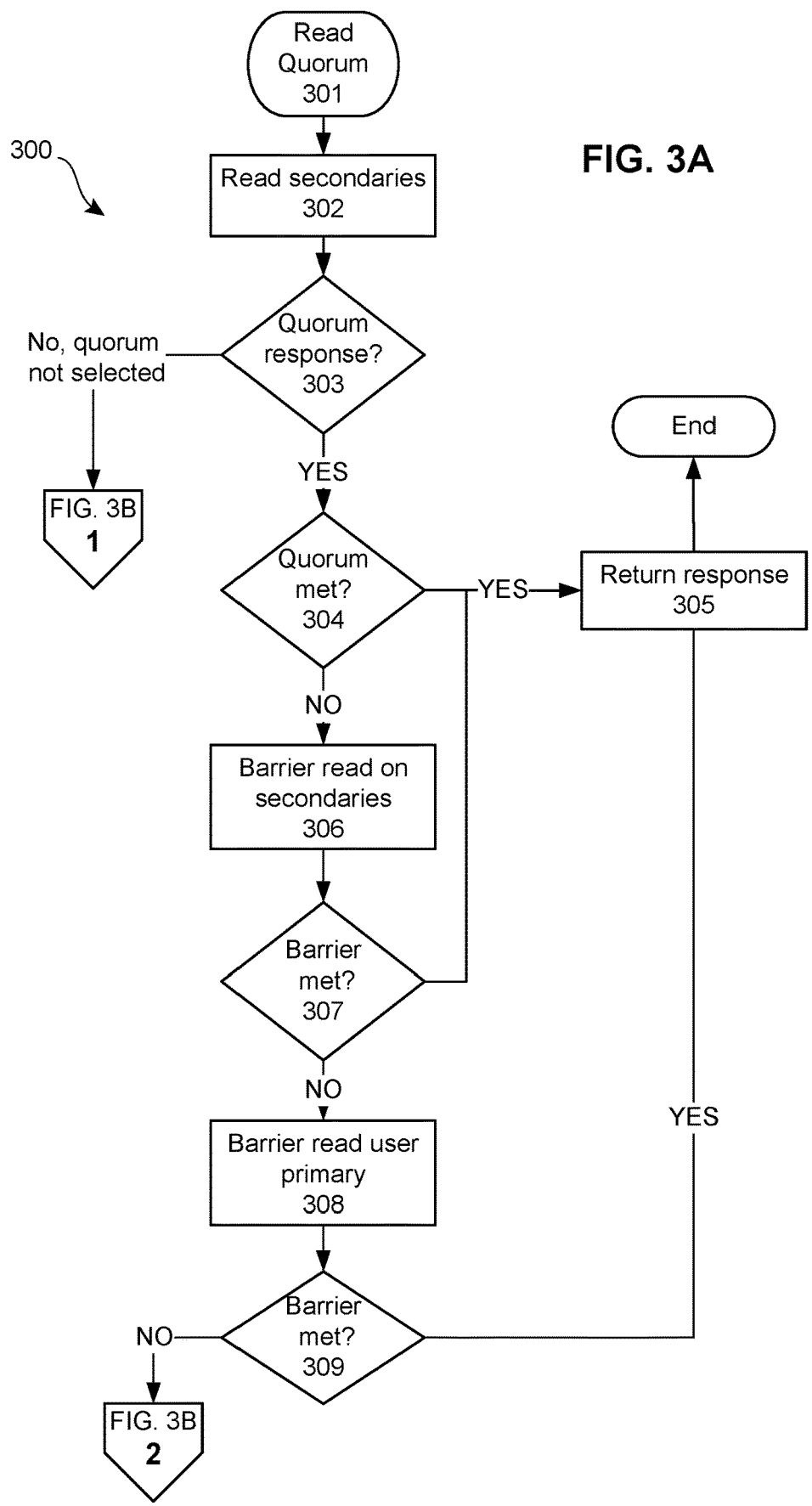
FIGS. 3A-3B depict a flowchart for a method of operating the system of FIG. 2
Figure 3B:
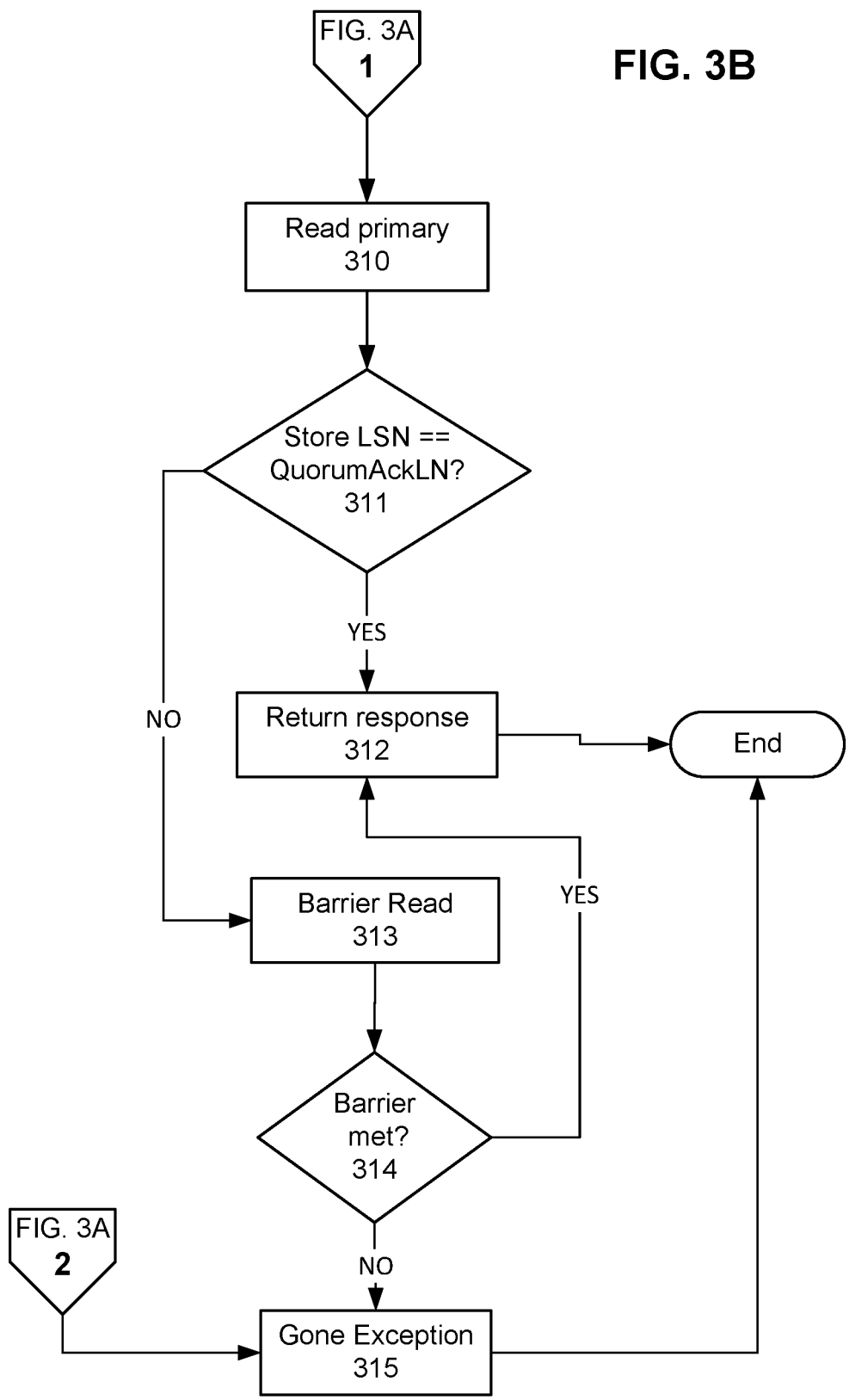

FIGS. 3A-3B depict a flowchart for a method of operating the system of FIG. 2. As shown in FIGS. 3A-3B, a read process for the system of FIG. 2 begins with an attempt to read a quorum 301. In the context of a document database system with replicas, a quorum read is a read operation that requires a certain number of replicas to respond in order to consider the read successful and consistent. The quorum is the minimum number of replicas that must acknowledge the read request for the system to proceed.

In the present example, the total number of replicas (n) is four. Write operations are considered committed when $(n/2+1)$ replicas have the latest commit. In this case, $(4/2+1)=3$ replicas. For a consistent read, a quorum of replicas should give the same snapshot of the document, and at least two replicas (n−n/2) should respond. So, in the context of a quorum read: Quorum Read Requirement: At least two replicas need to respond to the read request to consider it successful and consistent; Quorum Size: The quorum size is determined by the formula n−n/2, where n is the total number of replicas. In this case, it is 4−4/2=4−2=2.

Therefore, for a quorum read in this example, the quorum is met when at least two out of the four replicas respond to the read request with the same snapshot of the document. This approach helps balance consistency and availability, allowing the system to proceed with the read operation as soon as the quorum is reached, even if not all replicas are available.

Initially, a read request is sent to all three secondary replicas 302. The method then determines whether enough replicas, i.e., at least two replicas, have responded 303. If there are not at least two secondary replicas responding, it will not be possible to have a quorum based on the read call to the secondary replicas. In that case, the method moves to FIG. 3B, as indicated.

However, if at least two secondary replicas respond 303, the method next determines if at least two of the secondary replicas have the same version of the document, i.e., has the requirement for a quorum been met 304. If so, that version of the document is considered the current version and is returned to the user 305 and the read operation is complete.

If the at least two secondary replicas do not have the same version of the document, a barrier read 306 is performed. A barrier read is a technique designed to mitigate latency issues. Instead of waiting for responses from all replicas, a barrier read involves setting a barrier or a threshold for the number of replicas required to respond to consider the read operation as successful. This allows the system to proceed with the read operation as soon as the required number of replicas respond, without waiting for responses from all replicas.

For example, if the barrier is set to two replicas, the system will consider the read successful as soon as it receives responses from any two out of the three secondary replicas, without waiting for the third one. This helps reduce latency in scenarios where all replicas may not be available or respond in a timely manner. Thus, barrier reads are a trade-off between consistency and latency, and the choice of the barrier level depends on the desired level of consistency and the tolerance for latency in the specific system and application requirements.

In the present example, the barrier read is made only on the secondaries 306. If the barrier read is met 307, the response can be returned to the user 305 and the read operation is complete. If the barrier read is not met 307, a new barrier read is made that includes the primary replica 308 in an effort to satisfy the barrier read conditions. If this barrier read is met 306, the response is returned to the user 305 and the read operation is complete. However, if this second barrier read is not met 309, the operation moves to FIG. 3B as shown. The result of the second barrier read failing is a gone exception 315.

In the context of distributed databases and replication, a "gone exception" typically refers to an error or exception that occurs when the system has lost contact with a replica or node. The term "gone" implies that the system has lost contact with or cannot reach the specified replica or node. This could be due to reasons such as node failures, network issues, or intentional removal of the replica from the cluster. As shown in FIG. 3B, the gone exception ends the read operation.

Referring back to FIG. 3A, after an initial attempt to read the secondaries 302 and fewer than a possible quorum of secondaries respond 303, the method moves to FIG. 3B and a read request is sent to the primary replica 310. After reading the primary replica, the method checks for whether Store LSN equals QuorumAckLN 311. This refers to determining whether the Log Sequence Number (LSN) associated with a store operation is equal to the Log Sequence Number of a quorum of acknowledgment. Each replica generates its own Log Sequence Number (LSN) to keep track of the order of transactions in its local log.

Thus, the method checks whether Store LSN=QuorumAckLN, i.e., whether the LSN associated with the store operation is equal to the LSN of the quorum acknowledgment. This kind of check is common in distributed systems to ensure that a write operation has been replicated to a sufficient number of nodes for durability and consistency. If Store LSN equals QuorumAckLN, the reported version of the document is returned as the read response to the user 312, and the read operation ends.

If the Store LSN does not equal the QuorumAckLN, a new barrier read is initiated 313. If this barrier read is met 314, the reported version of the document is returned as the read response to the user 312, and the read operation ends. If not 314, a gone exception results 315 and the read operation ends.

However, as noted above, running the system with four full replicas has increased associated costs. It has been discovered that the same consistent/quorum read and similar resiliency can be achieved with just two secondary replicas and a fourth replica that is a lightweight, log-only replica. The log-only replica still takes part in the quorum write by recording the changes to the document made by each write request to the primary replica. However, the log-only replica does not have the actual data and hence cannot be used by the client to make any kind of read requests. From the client's standpoint, the end point for reading the log-only replica would be hidden. This helps in achieving significant cost reduction without compromising on the availability and resiliency of the service.

Figure 4:
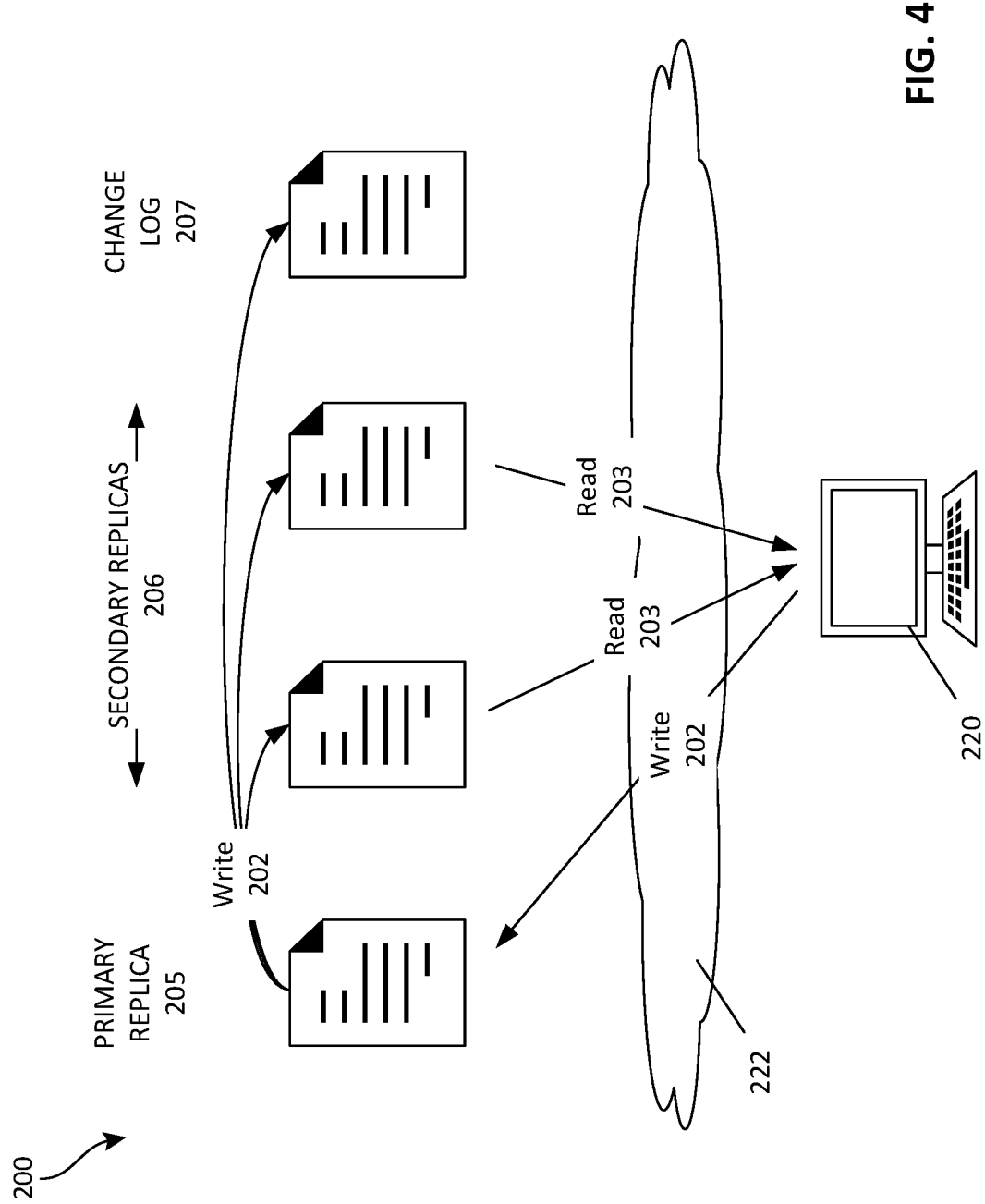
FIG. 4 depicts a system of utilizing multiple copies of information to promote continuous access to and survivability of the information while limiting the impact on resources according to principles described herein.

FIG. 4 depicts an example system of utilizing multiple copies of information to promote continuous access to and survivability of the information while limiting the impact on resources according to principles described herein. In the example of FIG. 4, the technique provides a consistent/quorum read request where the backend partition has only three full replicas (1 primary and 2 secondaries) and one log-only replica. The client 220 SDK is not aware of the end point of the log-only replica. Consequently, the client SDK has to be able to do consistent reads using the only the two full secondaries available.

At a high level, the approach for doing so refers again to FIG. 1. The read operation is executed as follows:
1. Make read calls to the two full secondary replicas.
2. If both replicas respond and they both have the same version of the document, then return the response to user.
3. If only one of them responds, then check the version of the document and determine the quorum by checking the head on primary. Wait for them to converge.
4. If both the secondaries do not respond, then read it from the primary. This should be a rare case, where both the secondaries are down.

Figure 5A:
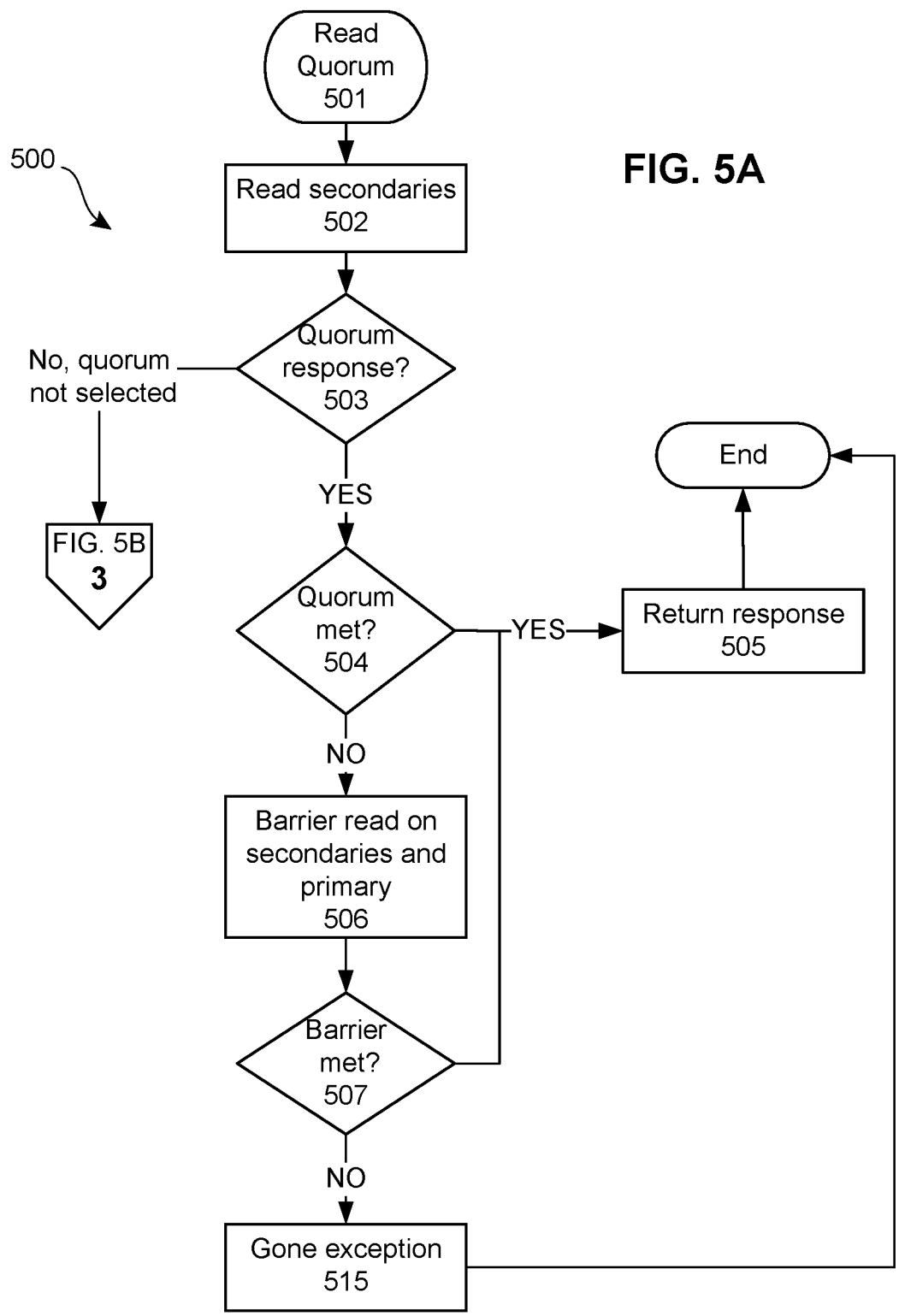
FIGS. 5A-5C depict a flowchart for a method of operating the system of FIG. 4.
Figure 5B:
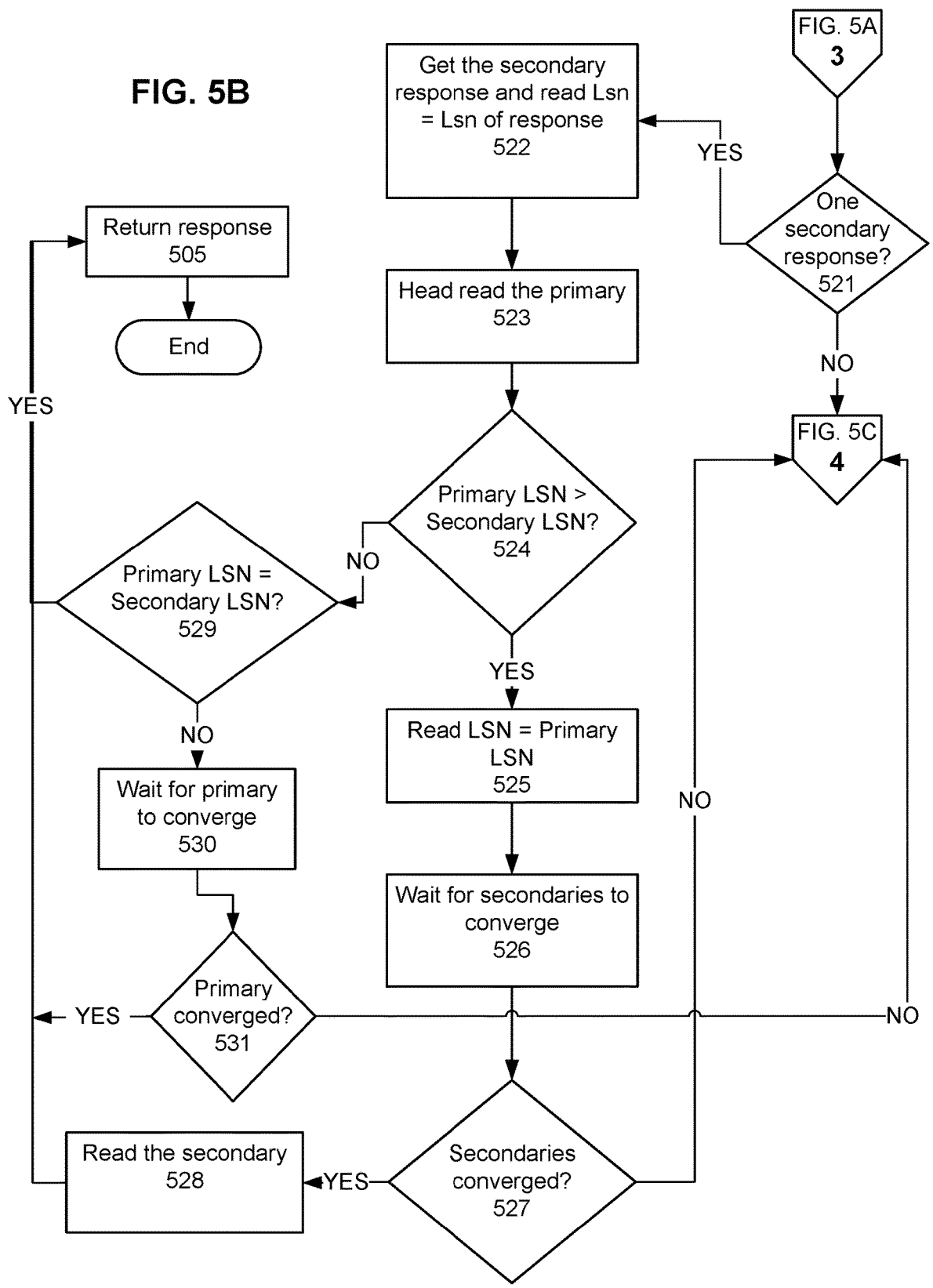
Figure 5C:
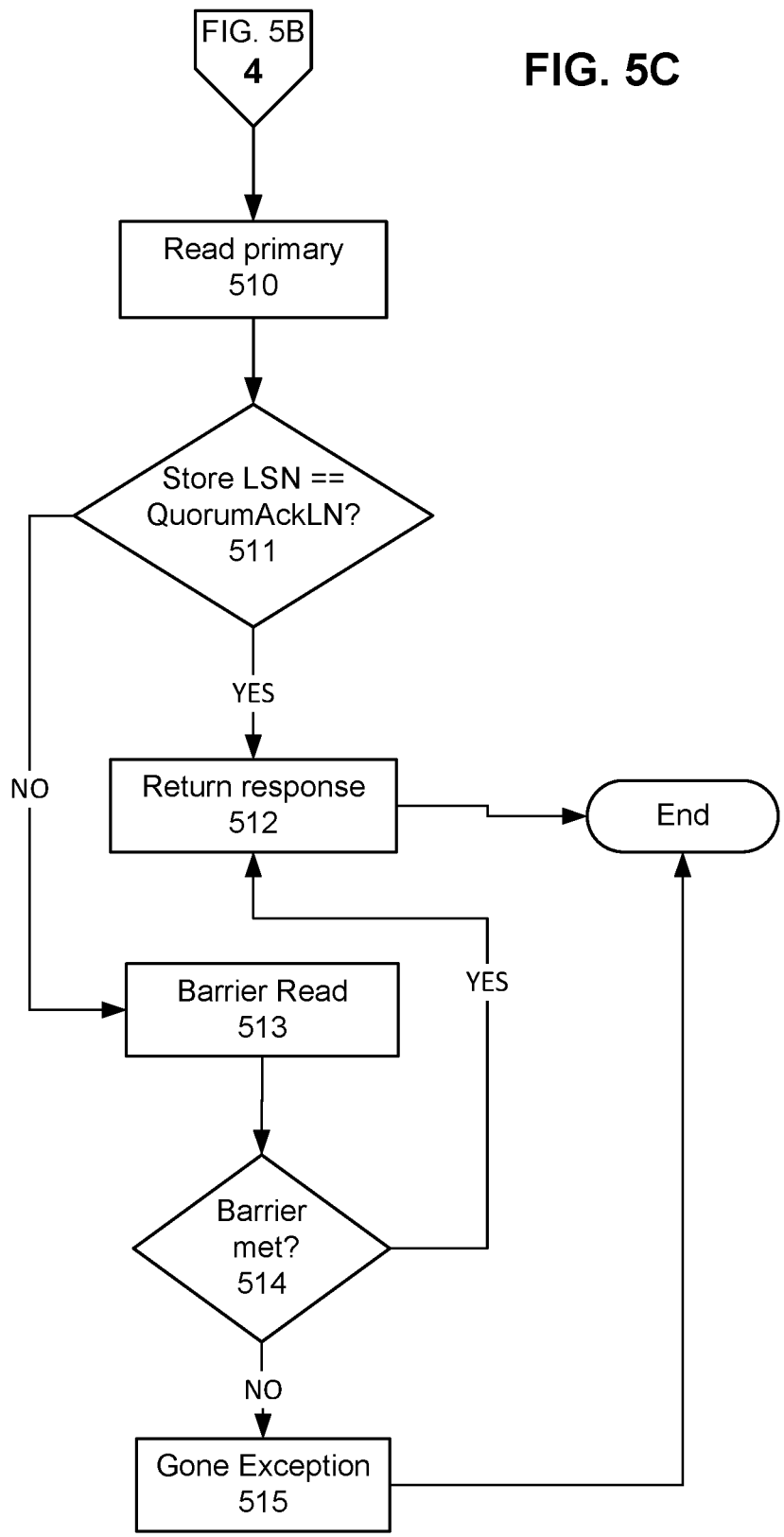

FIGS. 5A-C depict a flowchart with a more detailed example of this method of operating the system of FIG. 4. The method begins by attempting a quorum read 501, specifically attempting to read the secondaries 502. In the current example, this does not include the log-only replica. The method next determines if a quorum response is obtained 503. If not, the operation moves to FIG. 5B as described below.

If the quorum response 503 is received, the method next checks the versions to see if the quorum requirement is met 504. If a quorum has been met 504, i.e., both secondaries respond with the same version of the document, the result is returned to the user 505 and the read operation ends. If a quorum has not been met 504, a barrier read is called on both the two secondary replicas and the primary replica 506.

If the barrier is met 507, the result is returned to the user 505 and the read operation ends. If the barrier read is not met 507, a gone exception 515 is declared and the read operation ends unsuccessfully.

Returning again to the initial attempt to readjust the secondary replicas 502, when a quorum response is not received 503, operation moves to FIG. 5B and determination 521. At this point, the example method determines whether one of the secondaries has responded 521. If not, operation moves to FIG. 5C, as will be described below. If one of the secondaries has responded 521, the method obtains the secondary response 522, and the read LSN equals the LSN of the response.

The method then performs a head read of the primary replica 523 and determines whether the primary LSN is greater than the LSN of the secondary 524. If the primary LSN is not greater than the secondary LSN 524, the method checks whether the primary LSN equals the secondary LSN 529. If so, the response is returned to the user 505 and the read operation ends.

If the primary LSN does not equal the secondary LSN 529, the method waits for the primary to converge 530. If the primary converges 531, the response is returned to the user 505 and the read operation eds. If the primary does not converge, operation moves to FIG. 5C, as will be described below.

Returning to the head read of the primary replica 523 and the subsequent determination of whether the primary LSN is greater than the secondary LSN 524, if the primary LSN is greater than the secondary LSN, the read LSN=primary LSN 525. The method then waits for the secondaries to converge 526. If the secondaries converge 527, a secondary is read 528 and the response is returned to the user 505. The read operation then ends successfully. If the secondaries do not converge 527, the method moves to FIG. 5C.

Turning to FIG. 5C, there have been three different branches of the method that might advance to FIG. 5C. (1) Only one secondary replica is responding 521. (2) The primary replica is not converged 531. (3) The secondary replicas are not converged 527. In these instances, the method will read the primary 510.

The method then determines whether the store LSN equals the QuorumAckLN 511. If so, the response is returned to the user 512, and the read operation terminates successfully. If not, a barrier read 513 is made. If the barrier read is met 514, the result is returned to the user 512, and the read operation terminates successfully. If the barrier read is not met 514, a gone exception is declared, and the read operation terminates unsuccessfully.

An important difference between this approach and that of FIGS. 3A-3B is that the prior approach of FIGS. 3A-3B, and similar models, depends on at least three full secondary replicas to determine a consistent read for a document. In contrast, the approach of FIGS. 5A-5B achieves the same throughput and resiliency by utilizing occasional head reads on the primary replica to determine the quorum. The head read to the primary replica being occasional and less resource intensive, it enables the service partition to run with three full replicas (one primary and two secondary) and one delta or log-only replica. The savings in bandwidth, processing, storage and other resources will be significant and enable the database system, itself, to have improved functionality.

Figure 6:
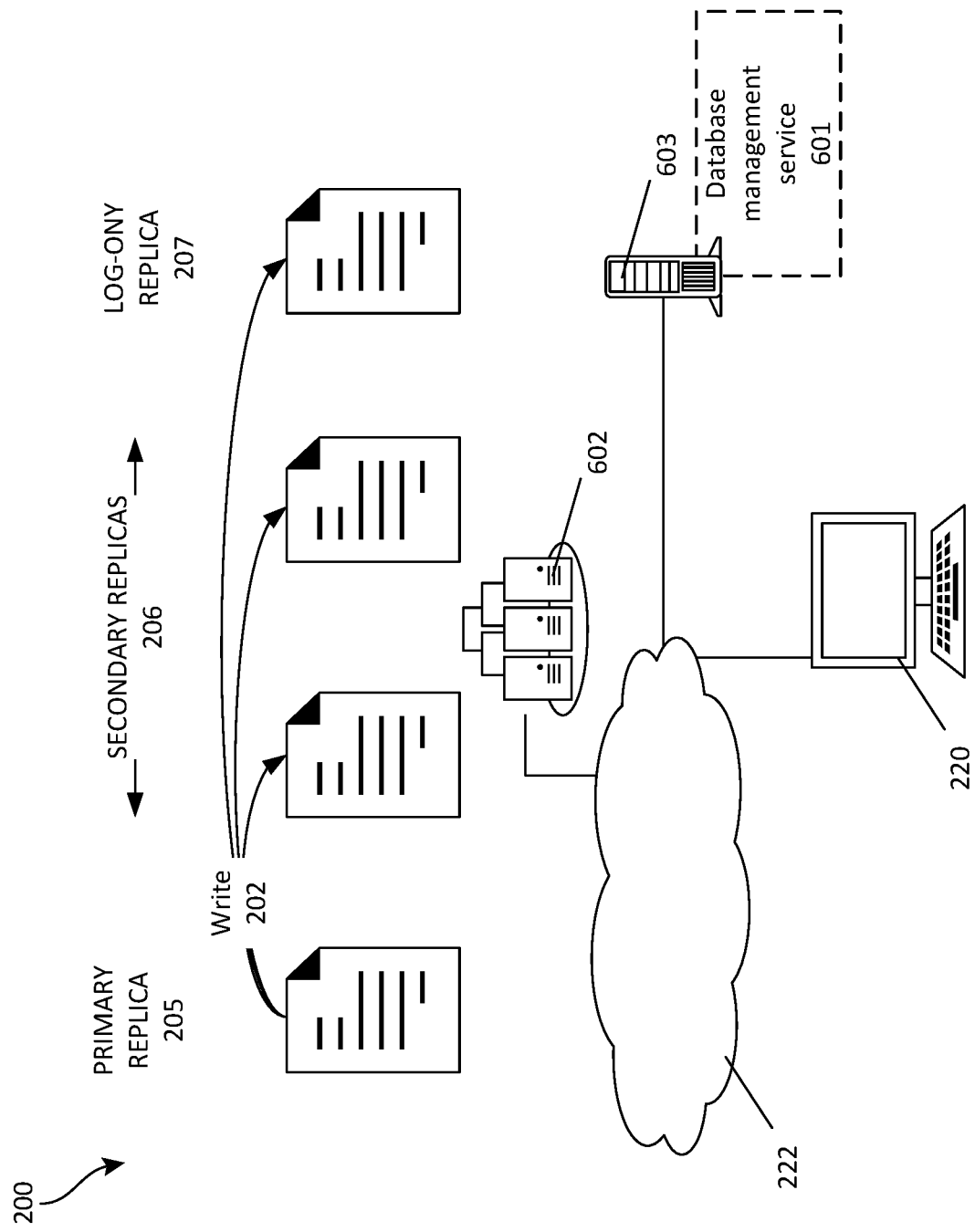
FIG. 6 depicts a system of utilizing multiple copies of information to promote continuous access to and survivability of the information according to principles described herein.
Figure 8:
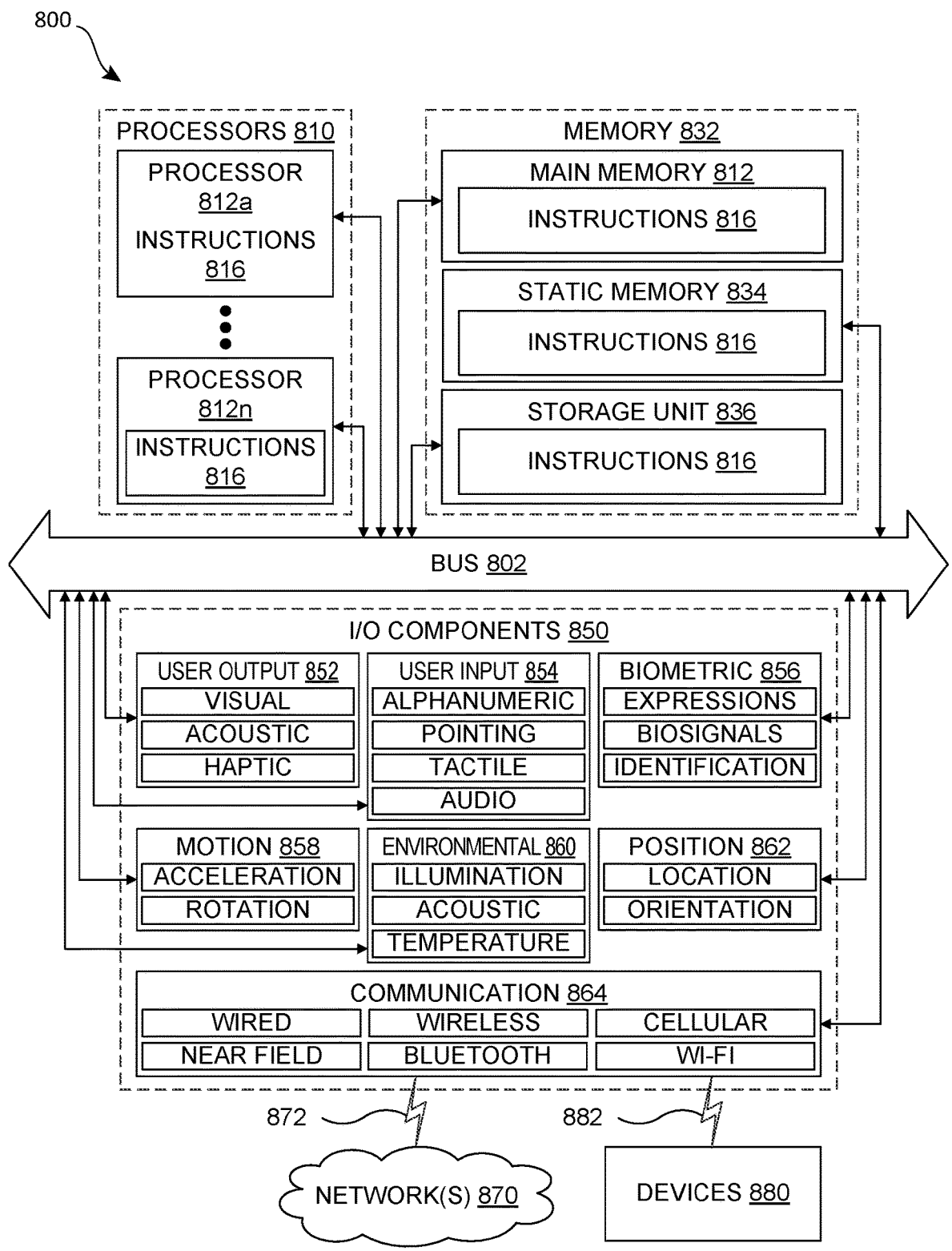
FIG. 8 is a block diagram illustrating components of an example machine configured to read instructions from a machine-readable medium and perform any of the features described herein.

FIG. 6 depicts a system of utilizing multiple copies of information to promote continuous access to and survivability of the information according to principles described herein. As shown in FIG. 6, a database management system for managing a database operates with each document being stored as a number of replicas for accessibility and data preservations. Specifically, the system includes a unit 603 having a processor 810 (FIG. 8), a network interface 870 (FIG. 8); and a memory 810 (FIG. 8). The memory 810 includes programming instructions for execution by the processor to implement a database management service 601. The service 601 is configured to maintain a primary replica 205 of a document, a number of secondary replicas 206 of the document, and another 207 log-only replica storing a log of changes to the document rather than contents of the document. As described herein, the service 601 makes head reads to the primary replica 205 as needed when a read request to the number of secondary replicas does not result in a quorum.

As further shown in FIG. 6, a user terminal 220 accesses the service 601 via network 222. A user operating the terminal 220 (e.g., 800, FIG. 8) can enter changes or "writes" to the document or request a read to retrieve the content of the document. These commands are provided to the service 601 via the network 222. As described above, the service 601 will execute write and read commands on the replicas 205-207 via the network 222. The replicas 205-207 can be stored on storage devices 602 at a single or at different locations. In other examples, the replicas 205-207 could be stored locally with the service 601.

Figure 7:
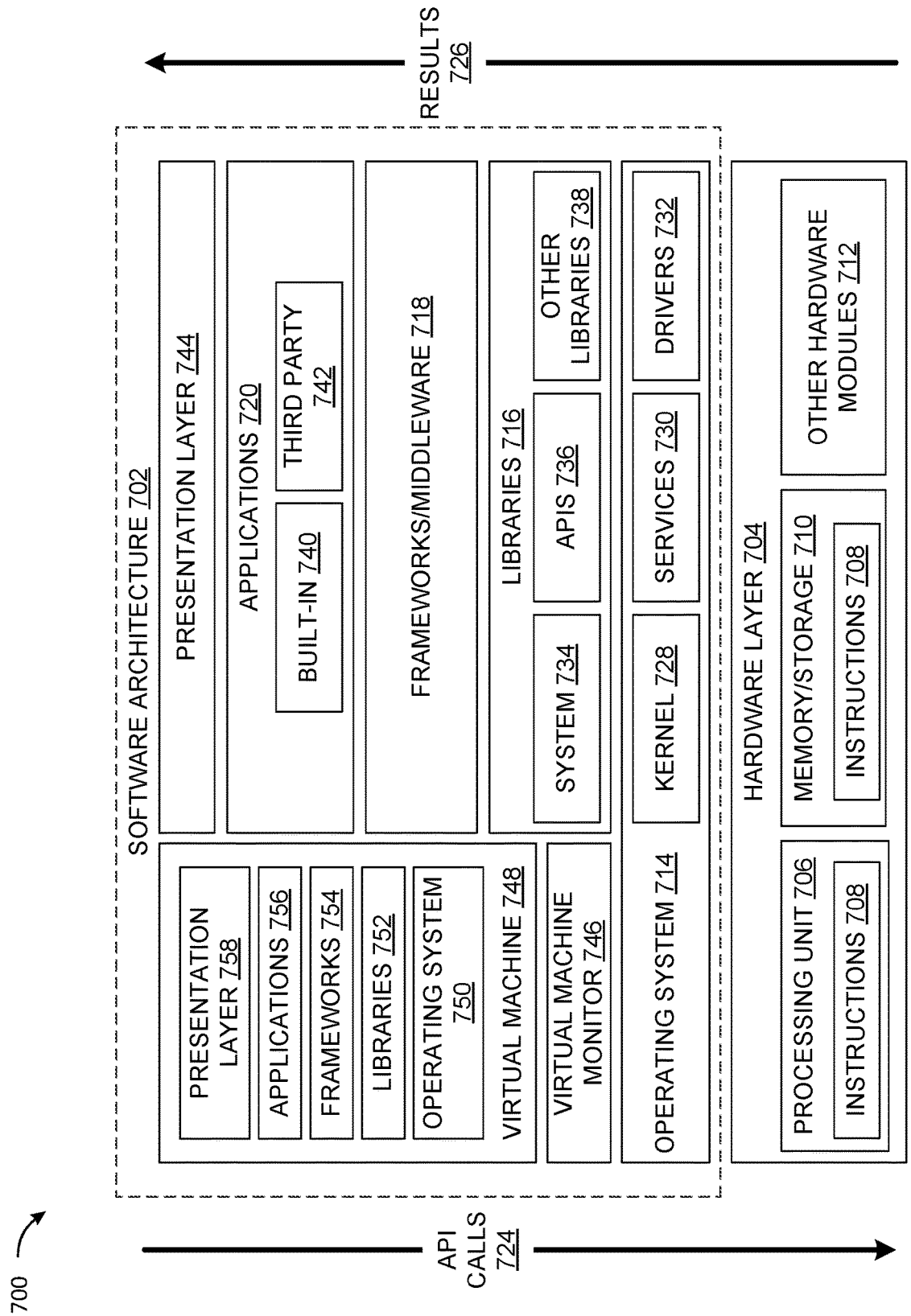
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

FIG. 8 is a block diagram illustrating components of an example machine 800 configured to read instructions from a machine-readable medium (for example, a machine-readable storage medium) and perform any of the features described herein. The example machine 800 is in the form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A database management system for managing a database in which each document is stored as a plurality of replicas for accessibility and data preservation, the plurality of replicas being set to a total number of replicas to balance data resiliency and demand on resources, the database management system comprising:
    a processor;
    a network interface; and
    a memory comprising programming instructions for execution by the processor to implement a database management service, the database management system configured to perform operations of:
        operating the database management service to maintain the total number of replicas during normal operations including a primary replica of a document, a plurality of secondary replicas of the document, and another log-only replica storing a log of changes to the document over time rather than contents of the document;
        addressing write requests received during the normal operations to the primary replica to update data in the primary replica;
        recording changes to the data in the primary replica in the log-only replica;
        receiving a read request to read the contents of the document from a user terminal;

in response to the read request, attempting to form a quorum by reading data from the plurality of secondary replicas, wherein forming the quorum for read requests includes receiving a response from (n−n/2) second replicas that have a same version of the document, wherein n is a total number of replicas configured to support the read request including the primary replica and the plurality of secondary replicas;

determining whether at least (n−n/2) secondary replicas of the plurality of secondary replicas have responded to the read request and have the same version of the document;

in response to determining that at least (n−n/2) secondary replicas of the plurality of secondary replicas have responded to the read request and have the same version of the document, providing the contents of the document to the user terminal; and in response to determining that at least (n−n/2) secondary replicas of the plurality of secondary replicas have not responded to the read request and do not have the same version of the document, providing the contents of the document to the user terminal without waiting for responses from a remainder of the plurality of secondary replicas based on responses being received from a threshold number of the plurality of secondary replicas that is less than (n−n/2).

2. The database management system of claim 1, wherein the plurality of secondary replicas of the document is only two.

3. The database management system of claim 1, wherein the database management service is configured to:
make read calls to two secondary replicas of the plurality of secondary replicas; and
if only one secondary replica of the two secondary replicas of the plurality of secondary replicas responds, determine a quorum by a head read to the primary replica.

4. The database management system of claim 1, wherein the database management service is configured to:
make read calls to two secondary replicas of the plurality of secondary replicas; and
if neither secondary replica of the two secondary replicas responds, make a read call to the primary replica.

5. The database management system of claim 1, wherein the database management service is configured to, in response to determining that a subset of the total number of replicas fails to form a quorum, declaring a gone exception.

6. The database management system of claim 1, wherein the database management service is configured to:
in response to a response being received from only one secondary replica, making a head read of the primary replica; and
if a primary Log Serial Number (LSN) is equal to a secondary LSN, returning current contents of the document to a user based on the response from the one secondary replica and the primary replica.

7. The database management system of claim 1, wherein the database management service is configured to:
in response to a response being received from only one secondary replica, making a head read of the primary replica; and
wait for the plurality of secondary replicas to converge before returning current contents of the document to a user based on the plurality of secondary replicas.

8. The database management system of claim 7, wherein the database management service is configured to, in response to the plurality of secondary replicas not converging:
making a read call to the primary replica;
determining if a store LSN is equal to a QuorumAckLN; and
responsive to the store LSN being equal to the QuorumAckLN, returning current contents of the document to the user based on a read of the one secondary replica and the primary replica.

9. The database management system of claim 8, wherein the database management service is configured to, in response to the store LSN not equaling the QuorumAckLN, executing a barrier read of the plurality of secondary replicas.

10. The database management system of claim 9, wherein the database management service is configured to, in response to the barrier read succeeding, returning current contents of the document to the user based on the barrier read.

11. The database management system of claim 9, wherein the database management service is configured to, in response to the barrier read not resulting in formation of a quorum, declare a gone exception.

12. A database management system for managing a database in which each document is stored as a plurality of replicas for accessibility and data preservation, the database management system comprising:
a processor;
a network interface; and
a memory comprising programming instructions for execution by the processor to implement a database management service, the database management system configured to perform operations of:
operating the database management service to maintain a primary replica of a document, a plurality of secondary replicas of the document, and a log-only replica storing a log of changes to the document over time rather than contents of the document;
addressing write requests received during normal operations to the primary replica to update data in the primary replica;
recording changes to the data in the primary replica in the log-only replica;
receiving a read request to read the contents of the document from a user terminal;
in response to the read request, attempting to form a quorum by reading data from the plurality of secondary replicas, wherein forming the quorum for read requests includes receiving a response from (n−n/2) replicas that have a same version of the document, wherein n is a total number of replicas configured to support the read request including the primary replica and the plurality of secondary replicas;
determining that a subset of the plurality of secondary replicas configured to support the read request, including at least a minimum threshold number of replicas, have responded to the read request and do not have a same version of the document and the subset of the plurality of secondary replicas configured to support the read request includes less than a number of replicas required to form the quorum;
performing a read on the primary replica responsive to the subset of the plurality of secondary replicas configured to support the read request including less than the number of replicas required to form the quorum;

determining that the primary replica has responded to the read;

determining that the subset of the plurality of secondary replicas configured to support the read request and the primary replica satisfy the number of replicas required to form the quorum; and providing the contents of the document to the user terminal without waiting for responses from a remainder of the plurality of secondary replicas based on responses being received from a threshold number of the plurality of secondary replicas that is less than (n−n/2).

13. The database management system of claim 12, wherein the database management service is configured to perform operations of:

making read calls to the plurality of secondary replicas; and responsive to only one of the plurality of secondary replicas responding, determine a quorum by a head read to the primary replica.

14. The database management system of claim 12, wherein the database management service is configured to:

make read calls to the plurality of secondary replicas; and responsive to none of the secondary replica responding, make a read call to the primary replica.

15. A method of managing a database in which each document is stored as a plurality of replicas for accessibility and data preservation, the method comprising:

maintaining a primary replica of a document, maintaining a number of secondary replicas of the document, maintaining a log-only replica that stores a log of changes to the document rather than full contents of the document;

addressing write requests received during normal operations to the primary replica to update data in the primary replica;

recording changes to the data in the primary replica in the log-only replica;

receiving a read request to read contents of the document from a user terminal;

in response to the read request, attempting to form a quorum by reading data from the primary replica and the number of secondary replicas, wherein forming the quorum for read requests includes receiving a response from (n−n/2) replicas that have a same version of the document, wherein n is a total number of replicas configured to support the read request including the primary replica and the number of secondary replicas;

determining whether at least (n−n/2) secondary replicas of the number of secondary replicas have responded to the read request and have the same version of the document;

in response to determining that at least (n−n/2) secondary replicas of the number of secondary replicas have responded to the read request and have the same version of the, providing the contents of the document to the user terminal; and in response to determining that at least (n−n/2) secondary replicas of the number of secondary replicas have not responded to the read request and do not have the same version of the document, providing the contents of the document to the user terminal without waiting for responses from a remainder of the number of secondary replicas based on responses being received from a threshold number of the number of secondary replicas that is less than (n−n/2).

16. The database management system of claim 1, wherein the at least (n−n/2) of the plurality of secondary replicas configured to support the read request includes less than a number of replicas required to form the quorum, and wherein the database management system is configured to perform a read on the primary replica responsive to the plurality of secondary replicas configured to support the read request including less than a number of replicas required to form the quorum.

* * * * *